No. 635,231. Patented Oct. 17, 1899.
W. E. CARMONT.
RESILIENT HUB FOR VEHICLE WHEELS.
(Application filed Feb. 6, 1899.)
(No Model.) 4 Sheets—Sheet 1.
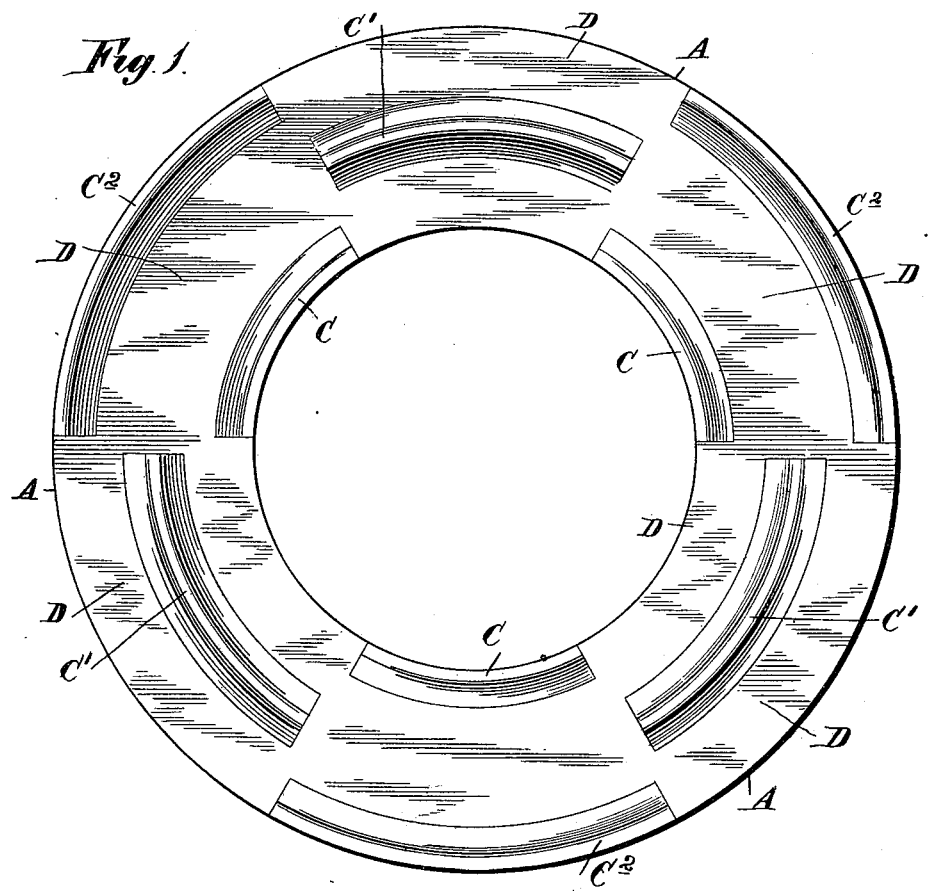
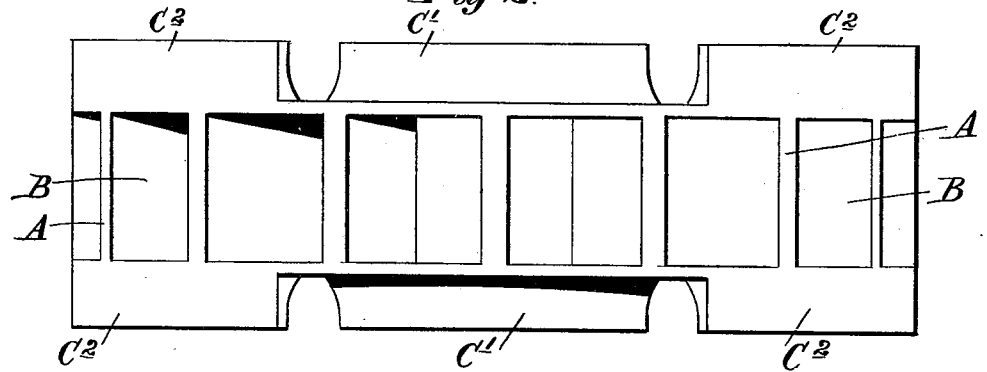
THE NORRIS PETERS CO., PHOTO-LITHO., WASHINGTON, D. C.

No. 635,231. Patented Oct. 17, 1899.
W. E. CARMONT.
RESILIENT HUB FOR VEHICLE WHEELS.
(Application filed Feb. 6, 1899.)

(No Model.) 4 Sheets—Sheet 2.

THE NORRIS PETERS CO., PHOTO-LITHO., WASHINGTON, D. C.

No. 635,231. Patented Oct. 17, 1899.
W. E. CARMONT.
RESILIENT HUB FOR VEHICLE WHEELS.
(Application filed Feb. 6, 1899.)

(No Model.) 4 Sheets—Sheet 4.

UNITED STATES PATENT OFFICE.

WILLIAM EDWARD CARMONT, OF KINGSTON-UPON-THAMES, ENGLAND.

RESILIENT HUB FOR VEHICLE-WHEELS.

SPECIFICATION forming part of Letters Patent No. 635,231, dated October 17, 1899.

Application filed February 6, 1899. Serial No. 704,672. (No model.)

*To all whom it may concern:*

Be it known that I, WILLIAM EDWARD CARMONT, a subject of the Queen of Great Britain, residing at Helmsdale, Kingston-upon-Thames, county of Surrey, England, have invented certain new and useful Improvements in Resilient Hubs for Wheels of Road-Vehicles, of which the following is a specification.

This invention has for its object a novel construction or arrangement of hub-frame or parts thereof for holding and supporting india-rubber washer-like rings as the resilient material in the hubs of wheels for road-vehicles.

For the purpose of my invention I form in each of the two faces of a hub proper segmental wings at parts thereof which are intersected by segmental wings of end plates and form annular channels in which rubber rings can be located, the spaces between the several wings and of the ends thereof allowing for expansion of the rubber as the resilient body on which the load is supported.

My invention is represented on the annexed sheets of drawings.

Figure 3:
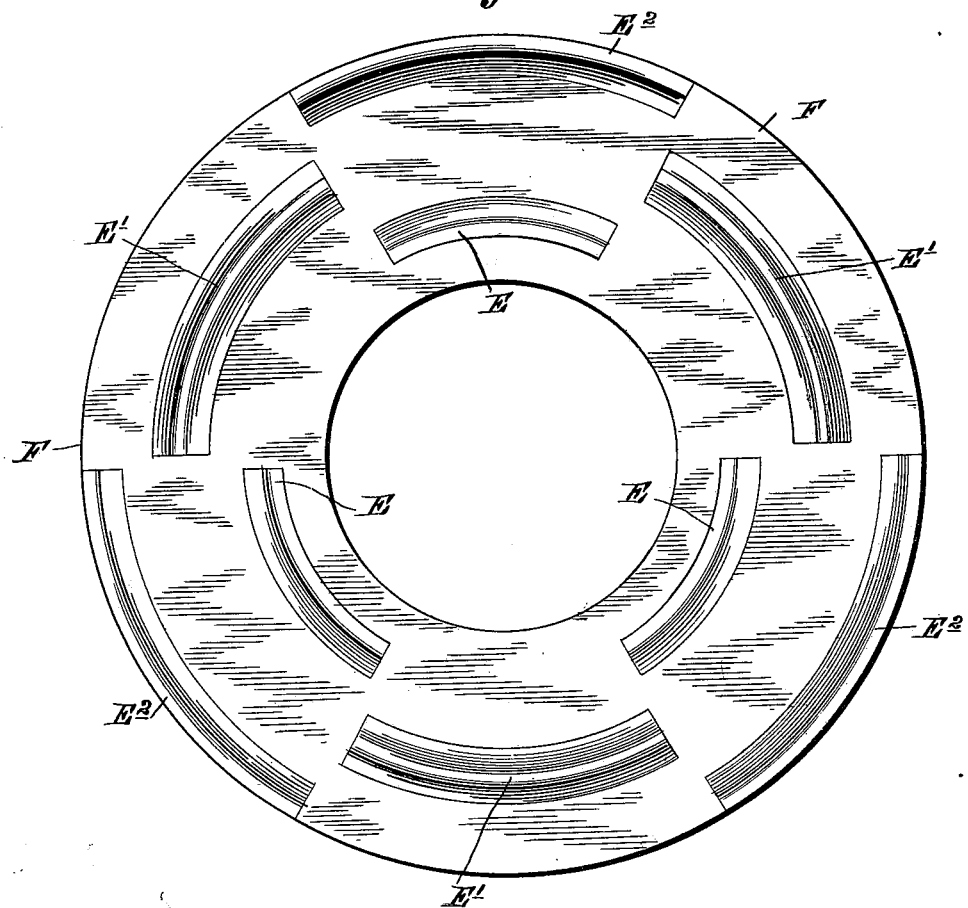
Figure 4:
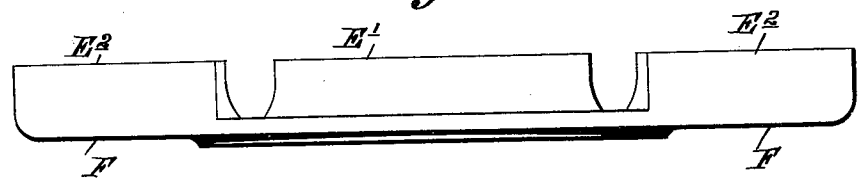
Figure 5:
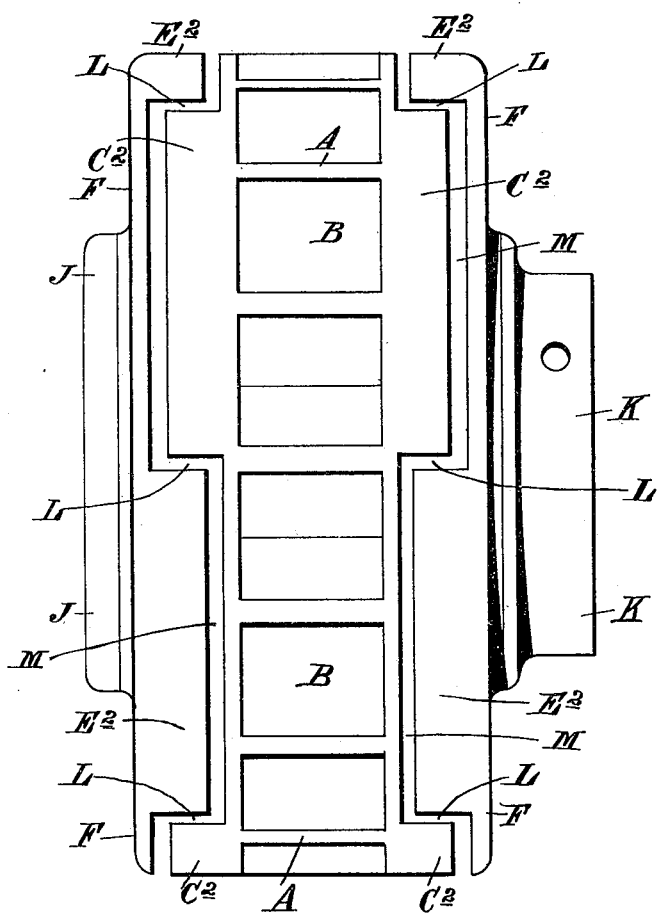
Figure 6:
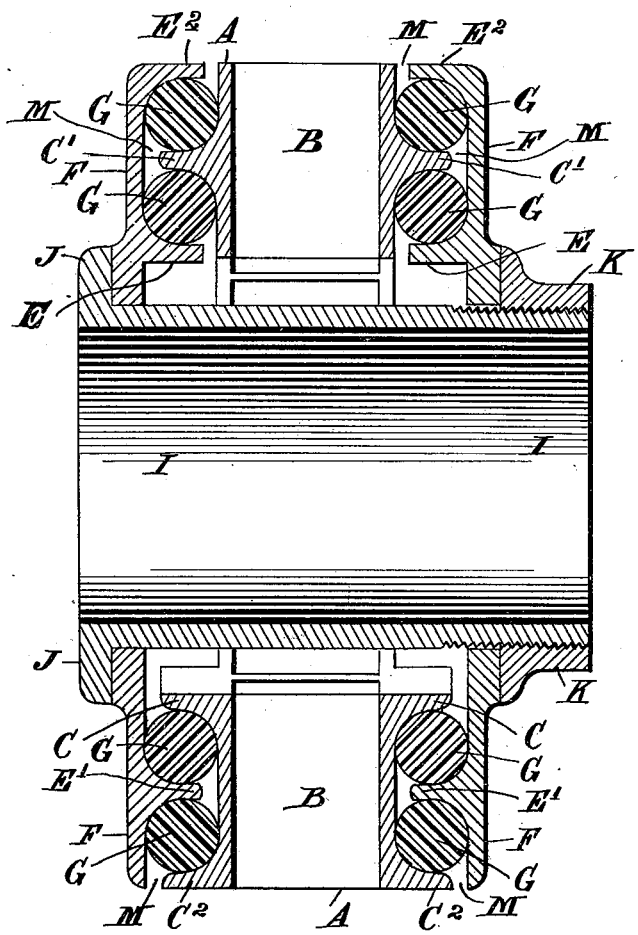

Figure 1 is a face view of one side face of the hub proper; Fig. 2, an edge view of hub; Fig. 3, an inner face view of one of the end plates; Fig. 4, an edge view of same, the two end plates being alike; Fig. 5, an edge view of hub proper and of the two face-plates in the position they occupy in relation to each other; Fig. 6, a vertical section of hub proper and the two face-plates with the rubber resilient rings in place between the wings.

A is the hub proper; B, holes for spoke ends; C C, inner segmental wings on the two outer faces alternately arranged; C' C', intermediate segmental wings; C² C² outer segmental wings in circular formation with intervening recesses or gaps D D into which the several wings E E E' E' E² E² of two face-plates F F become loosely located when the three parts are in their respective places; G G, india-rubber rings occupying the annular channels formed between the wings of the three parts, which outer wings collectively form a shield, as the outer periphery of the hub A and end plates F F, the ends of the wings not being in touch with each other to allow of play between them, due according to the load carried and the oscillations of the wheel during its travel; I, inside hollow bolt with flange J at one end and a screw-thread at the other, on which is a nut K, capable of being screwed up by a spanner or wrench to squeeze the end plates F F up to the rubber rings G G to the necessary degree to prevent wabbling and to preserve the location of the rubber rings G G in place, said hollow bolt serving also as the axle-box, if so desired, in which the axle of the vehicle can find a location, or a separate axle-box may be sprung inside the bolt I.

The little gaps L L left between the ends of the wings, in conjunction with the spaces M M left between the faces of the wings and of the bases of the opposite wings, respectively, serve for the rubber when under compression to be squeezed into, and so prevent the hub creeping on the end plates or the end plates creeping on the hub.

By this invention the compression of the rubber, due to the load, becomes distributed over the entire area of the rings G G, both above and below the axial vertical line, and as the wheel travels this compression is ever variable, so that the parts of the rubber not under compression are free to expand and so maintain the resiliency of the same and prevent any part becoming rigid, such as when the rubber is so confined or wholly boxed in.

Prior to my invention a resilient pneumatic hub for a wheel was known in which the compression took place practically over the entire half of each one of two complete concentric rings which were employed on the hub and outer part of the wheel. In my present invention the "concentric rings," as they are termed, are formed in segments, neither one being complete until the hub A and face-plates F are brought together, whereby the compression of the rubber instead of being exerted over one entire half of either ring is distributed proportionally to different parts. In other words, assuming that the wheel was so placed that the flange E² in Fig. 3 of the drawings was at the apex, the compression would be by the said flange E² on the outer rubber ring and on the upper two of the flanges E' on the inner rubber ring for the half-circumference above the axle, and for the half-circumference below said axle it would be by the two lower flanges E on the inner rubber ring and by the single lower flange E' on the outer rubber ring. The compression is thus distributed over two rings, one-sixth part of the circumference of the outer ring being compressed above and two-sixths of its circumference below the axle. The distribution on the inner ring will be reversed, two-sixths of its circumference being under compression above and one-sixth below the axle. When one of the flanges $C^2$ is at the apex, the points of compression will be reversed, the flanges $E^2$ acting upon two portions of the outer ring and the flange E' on the inner ring above the axle, the lower flange E acting on the inner ring and the two flanges E' acting upon the outer ring below the axle. In this manner my invention insures a constant and uniform change of conditions during the rotation of the wheel. Moreover, those portions of the rubber rings not under compression can expand freely, and thus prolong the term of use of the rubber. By my invention I always take my bearing upon both rings above and both rings below the axle, whereas in the wheel prior to my own the bearing was upon one ring above the axle and upon the other ring below the same.

What I claim, and desire to secure by Letters Patent, is—

A wheel-hub consisting of segmental wings C, C', $C^2$, in outer opposite faces of hub proper A, segmental wings E, E', $E^2$, in inner faces of end plates F, and arranged to intersect each other both circumferentially and at the ends intermediate rubber rings G, G, hollow bolt I and tightening-nut K, as specified and substantially as shown.

In testimony whereof I have hereunto set my hand in presence of two subscribing witnesses.

WILLIAM EDWARD CARMONT.

Witnesses:
HENRY GARDNER,
RICHARD CORE GARDNER.